(12) United States Patent
Song

(10) Patent No.: US 7,842,950 B2
(45) Date of Patent: Nov. 30, 2010

(54) DISPLAY DEVICE WITH FIELD GENERATING ELECTRODES

(75) Inventor: Jang-Kun Song, Seoul (KR)

(73) Assignee: Samsung Electronics Co., Ltd., Gyeonggi-do (JP)

( * ) Notice: Subject to any disclaimer, the term of this patent is extended or adjusted under 35 U.S.C. 154(b) by 1093 days.

(21) Appl. No.: 11/120,599

(22) Filed: May 2, 2005

(65) Prior Publication Data
US 2006/0108584 A1 May 25, 2006

(30) Foreign Application Priority Data
Nov. 25, 2004 (KR) .................. 10-2004-0097437

(51) Int. Cl.
*H01L 31/0376* (2006.01)

(52) U.S. Cl. ............. 257/59; 257/57; 257/252; 257/253; 257/257; 257/254; 257/E33.004; 257/E21.001; 257/E21; 257/E27.132; 257/E27.117; 257/258; 438/22; 438/48

(58) Field of Classification Search .......... 257/57, 257/59, 72, 83, 257, 290, 351, 368, 392, 257/252, 253, 254, 258, E21.001, E21, E33.004, 257/E27.1, E27.132, E31.097; 438/22, 48
See application file for complete search history.

(56) References Cited

U.S. PATENT DOCUMENTS

| | | | | |
|---|---|---|---|---|
| 5,610,739 | A * | 3/1997 | Uno et al. ............. | 349/39 |
| 6,424,398 | B1 * | 7/2002 | Taniguchi ............. | 349/143 |
| 6,750,934 | B2 | 6/2004 | Sakamoto et al. | |
| 6,784,949 | B1 * | 8/2004 | Nagata et al. .......... | 349/39 |
| 6,900,869 | B1 * | 5/2005 | Lee et al. ............. | 349/129 |
| 6,933,997 | B2 * | 8/2005 | Kim ................. | 349/139 |
| 6,950,158 | B2 * | 9/2005 | Chang ............... | 349/114 |
| 6,969,872 | B2 * | 11/2005 | Kim ................. | 257/72 |
| 6,995,394 | B2 * | 2/2006 | Hong et al. .......... | 257/59 |
| 7,015,548 | B2 * | 3/2006 | Song et al. .......... | 257/347 |
| 2003/0112398 | A1 | 6/2003 | Kim et al. | |
| 2004/0070713 | A1 * | 4/2004 | Song ................ | 349/129 |
| 2004/0233343 | A1 * | 11/2004 | Baek ................ | 349/38 |

FOREIGN PATENT DOCUMENTS

CN    1506722 A    6/2004

(Continued)

*Primary Examiner*—Wael M Fahmy
*Assistant Examiner*—Marc Armand
(74) *Attorney, Agent, or Firm*—Innovation Counsel LLP

(57) ABSTRACT

A display device including a first substrate, a first subpixel electrode, a second subpixel electrode corresponding to the first substrate, a second substrate and a common electrode formed on the second substrate is provided. The first subpixel electrode and the second subpixel electrode are formed on the first substrate. The second subpixel electrode is spaced apart from the first subpixel electrode. The common electrode has a first cutout and a second cutout. The first cutout is disposed over the first subpixel electrode and the second cutout is disposed over the second subpixel electrode. At least a portion of the first cutout has a first width and at least a portion of the second cutout has a second width different from the first width. The first width is larger than the second width in one embodiment. This structure enhances the aperture ratio and the brightness of the display device. Failures such as a residual image, stain or fingerprint may be reduced and the picture quality is improved.

7 Claims, 5 Drawing Sheets

FOREIGN PATENT DOCUMENTS

| | | |
|---|---|---|
| JP | 7325323 A | 12/1995 |
| JP | 2000-267079 A | 9/2000 |
| JP | 2001-249350 A | 9/2001 |
| JP | 2002-169159 A | 6/2002 |
| JP | 2003-330043 A | 11/2003 |
| JP | 2004-037853 A | 2/2004 |
| KR | 10-2001-0039261 A | 5/2001 |
| KR | 10-2002-0010214 A | 2/2002 |
| KR | 10-2002-0017312 A | 3/2002 |
| KR | 10-0354906 A | 9/2002 |
| KR | 10-0381868 A | 4/2003 |
| KR | 10-2004-0008920 A | 1/2004 |

* cited by examiner

DISPLAY DEVICE WITH FIELD GENERATING ELECTRODES

CROSS-REFERENCE TO RELATED APPLICATION

This application claims priority from Korean Patent Application No. 2004-97437 filed on Nov. 25, 2004, the contents of which are herein incorporated by reference in its entirety.

BACKGROUND OF THE INVENTION

1. Field of the Invention

The present invention relates to display devices, and more particularly to display devices having common electrodes with cutouts having different widths.

2. Description of the Related Art

A liquid crystal display (LCD) device includes two panels provided with field-generating electrodes such as a pixel electrode and a common electrode, and a liquid crystal (LC) layer interposed therebetween. The LCD device displays images by applying voltages to the field-generating electrodes to generate an electric field in the LC layer, which determines orientations of LC molecules in the LC layer. The LCD device is widely used in various electronic devices because of its characteristics, such as low voltage operation, low power consumption, and low weight.

The LCD device, however, tends to have restrictions in the range of a viewing angle. For widening the viewing angle, a vertical alignment (VA) mode LCD device having cutouts in the field-generating electrodes or protrusions on the field-generating electrodes has been developed.

The cutouts and the protrusions enable the tilt directions of LC molecules to be distributed into several directions to widen the viewing angle. Thus, a typical VA mode LCD device has a wide viewing angle that makes the contrast ratio equal to about 1:10.

Although the viewing angle can be widened in a VA mode LCD device, the VA mode LCD device still has several disadvantages. For example, the quality of lateral visibility is poor compared with that of front visibility. As the LCD device has been used in multimedia devices, the lateral visibility has become more important.

BRIEF DESCRIPTION OF THE DRAWINGS

The above and other features and advantages of the present invention will become readily apparent by reference to the following detailed description when considered in conjunction with the accompanying drawings wherein.

SUMMARY OF THE INVENTION

Figure 1:
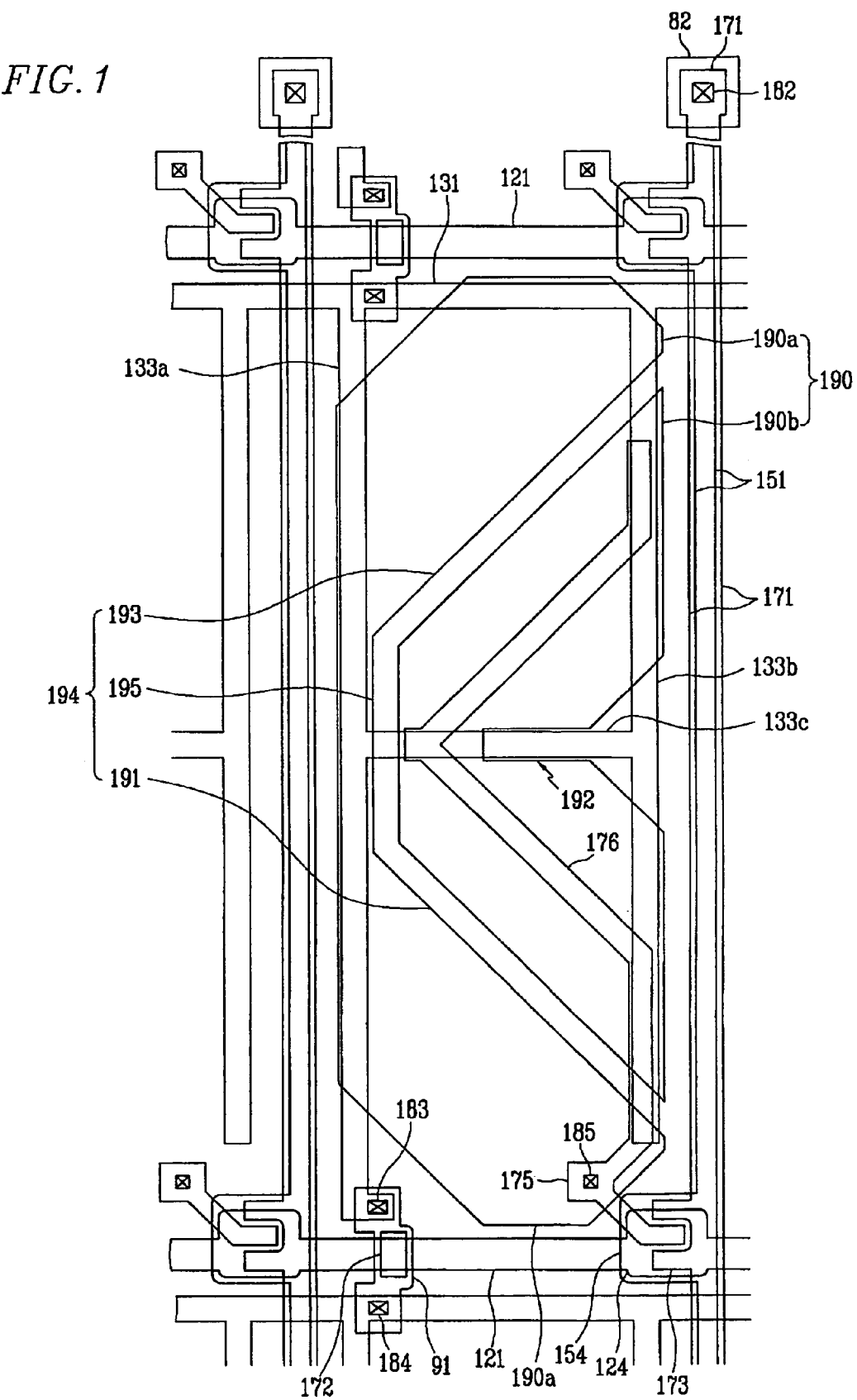
FIG. 1 is a top view of a TFT (Thin Film Transistor) array panel of a liquid crystal display (LCD) device according to an exemplary embodiment of the present invention.

One aspect of the invention is directed to a display device having an improved picture quality. In one embodiment, the display device includes a first substrate, a first subpixel electrode and a second subpixel electrode formed on the first substrate, a second substrate overlying the first substrate, and a common electrode having a first cutout and a second cutout formed on the second substrate. Note that "overlying" is used herein as a relative term, such that "overlying" also includes the orientation of the second substrate "below" the first substrate. The second subpixel electrode is spaced apart from the first subpixel electrode. The first cutout is disposed over the first subpixel electrode and the second cutout is disposed over the second subpixel electrode. At least a portion of the first cutout has a first width and at least a portion of the second cutout has a second width different from the first width. A voltage applied to the first subpixel electrode is different from a voltage applied to the second subpixel electrode. The first width is larger than the second width by about 10% to about 62%, about 15% to about 40% in one embodiment. The first width is larger than the second width by about 1.0 µm to about 4.0 µm, about 1.5 µm to about 3.0 µm in one embodiment.

In another embodiment, the display device includes a first substrate, a gate line formed on the first substrate, a data line intersecting the gate line formed on the first substrate, a thin film transistor connected to the gate line and the data line, a first subpixel electrode connected to the thin film transistor, a coupling electrode connected to the first subpixel electrode, a second subpixel electrode spaced apart from the first subpixel electrode, a second substrate corresponding to the first substrate, and a common electrode having a first cutout and a second cutout formed on the second substrate. The second subpixel electrode overlaps the coupling electrode. The first cutout is disposed over the first subpixel electrode and the second cutout is disposed over the second subpixel electrode. At least a portion of the first cutout has a first width and at least a portion of the second cutout has a second width different from the first width. A voltage applied to the first subpixel electrode is different from a voltage applied to the second subpixel electrode. The first width is larger than the second width by about 10% to about 62%, about 15% to about 40% in one embodiment. The first width is larger than the second width by about 1.0 µm to about 4.0 µm, about 1.5 µm to about 3.0 µm in one embodiment.

Varying the widths of the cutouts corresponding to the voltages of the subpixel electrodes enhances the aperture ratio of the display device. Thus, the brightness of the display device is enhanced, and failures such as a residual image, stain, or fingerprint may be reduced.

DESCRIPTION OF THE PREFERRED EMBODIMENT

The present invention is described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout the specification. It will be understood that when an element such as a layer, film, region or substrate is referred to as being 'on' another element, it can be directly on the other element or intervening elements may also be present. In contrast, when an element is referred to as being 'directly on' another element, there are no intervening elements present.

Hereinafter, a liquid crystal display (LCD) device according to an embodiment of the present invention will be described in detail with reference to the accompanying drawings.

Figure 2:
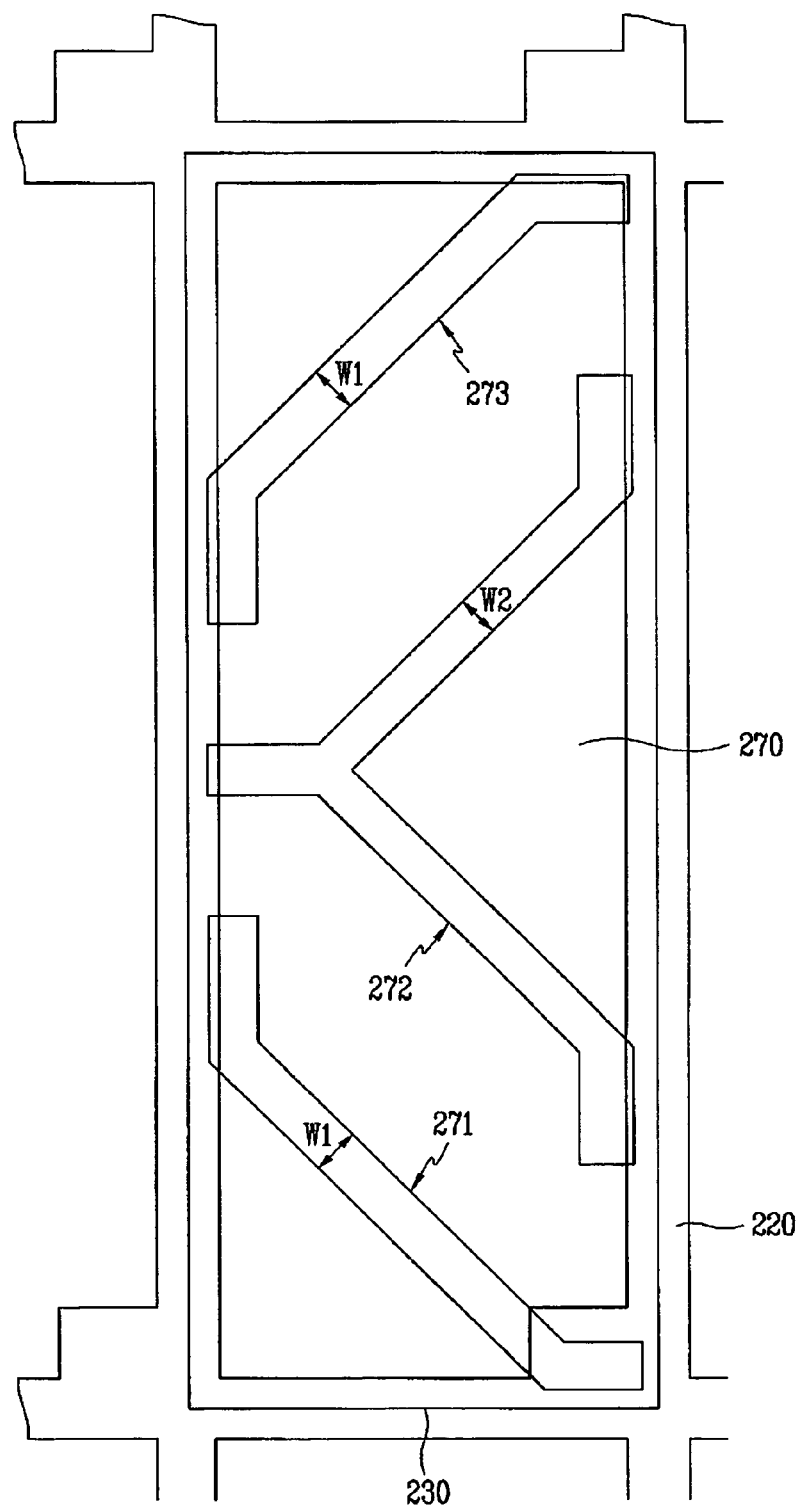
FIG. 2 is a top view of a common electrode panel of an LCD device according to an exemplary embodiment of the present invention.
Figure 3:
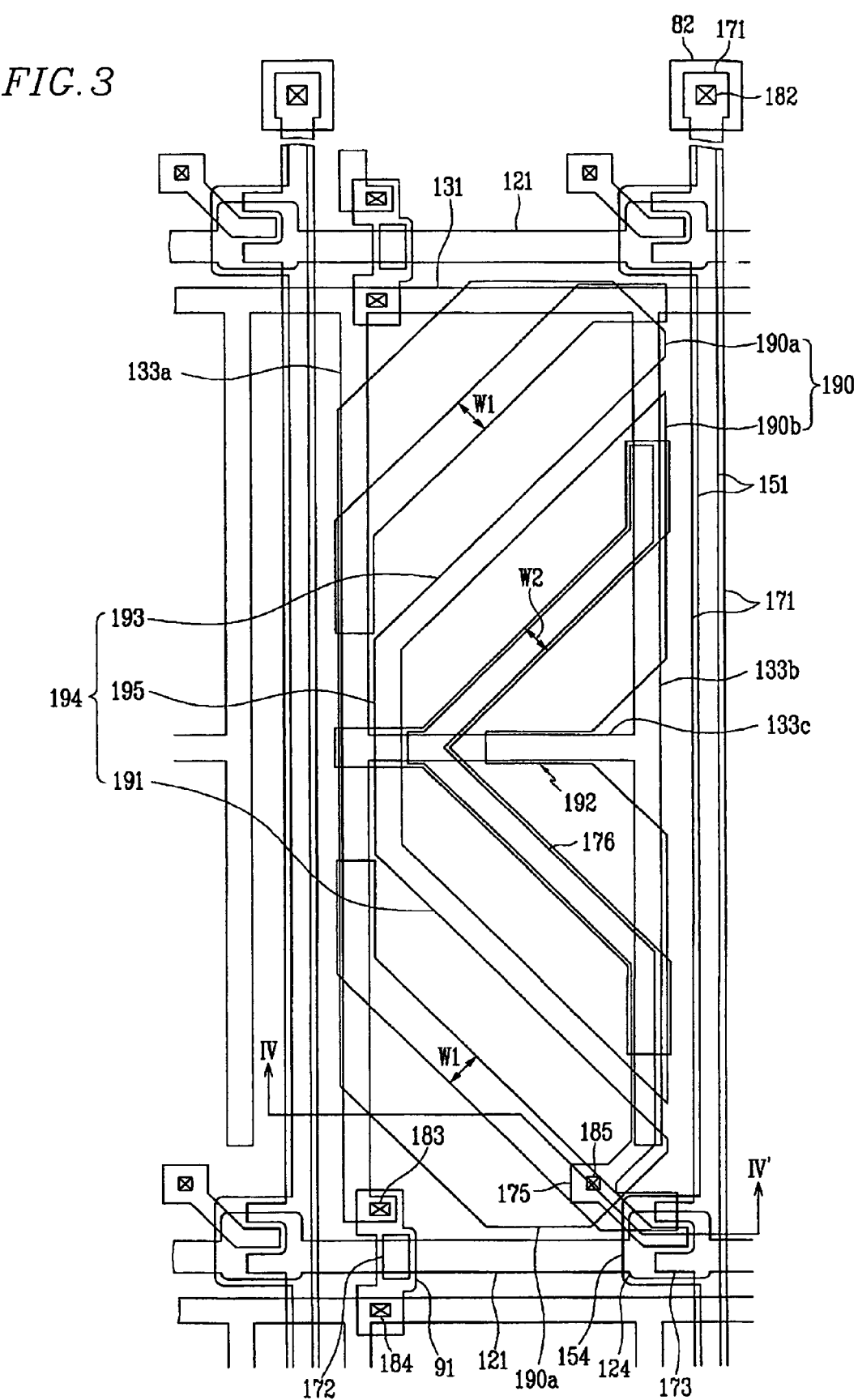
FIG. 3 is a top view of the LCD device having the TFT array panel of FIG. 1 and the common electrode panel of FIG. 2.
Figure 4:
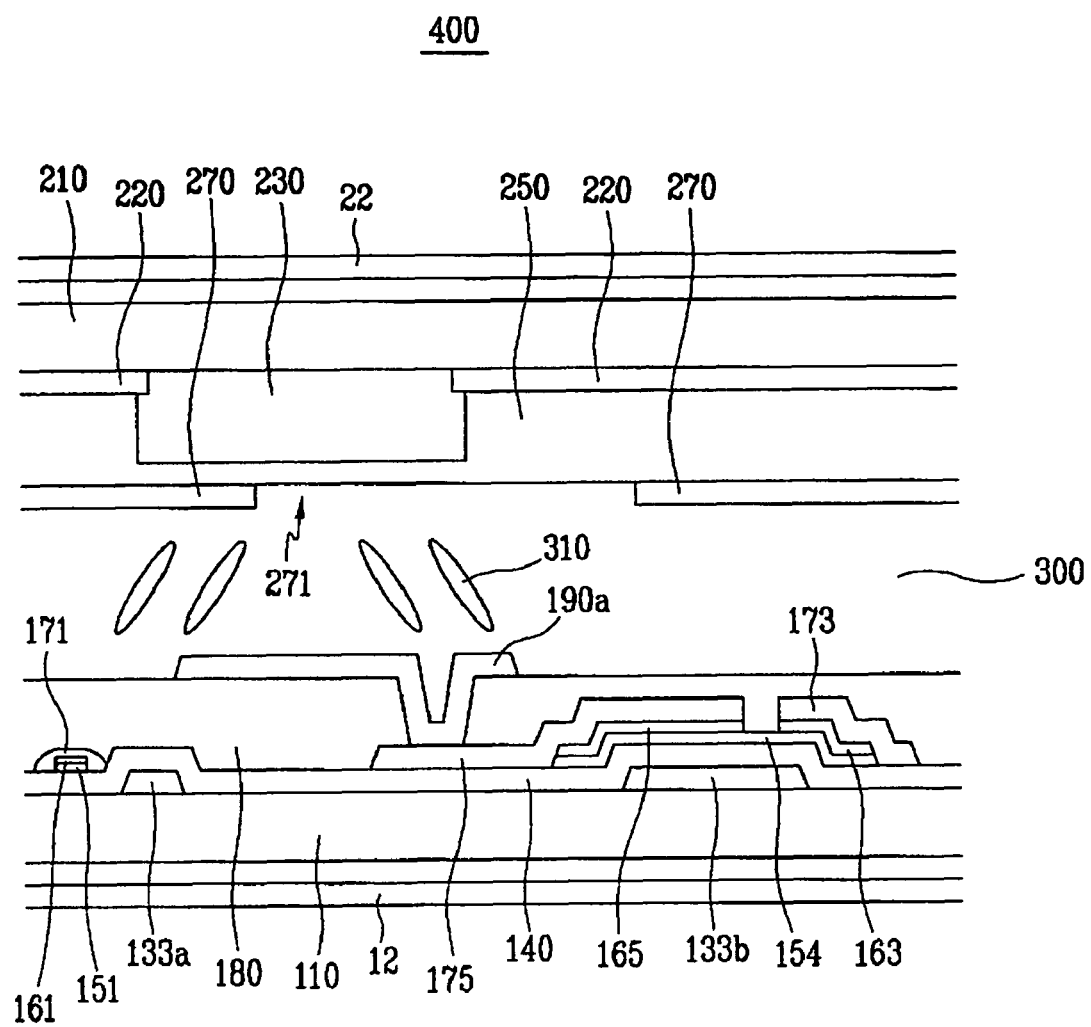
FIG. 4 is a cross-sectional view taken along the line IV-IV' of FIG. 3.

FIG. 1 is a top view of a thin film transistor (TFT) array panel of an LCD device according to an exemplary embodiment of the present invention. FIG. 2 is a top view of a common electrode panel of an LCD device according to an exemplary embodiment of the present invention. FIG. 3 is a top view of the LCD device having the TFT array panel of FIG. 1 and the common electrode panel of FIG. 2. FIG. 4 is a cross-sectional view taken along the line IV-IV' of FIG. 3.

Referring to FIG. 4, an LCD device 400 according to an exemplary embodiment of the present invention includes a thin film transistor (TFT) array panel 100, a common electrode panel 200, and a liquid crystal (LC) layer 300 interposed between the TFT array panel 100 and the common electrode panel 200.

Hereinafter, the TFT array panel 100 will be described in detail with reference to FIGS. 1, 3 and 4.

A plurality of gate lines 121 and a plurality of storage electrode lines 131 are formed on a first substrate 110. The first substrate 110 may include a transparent insulating material such as glass.

The gate lines 121 are configured to transmit gate signals and extend in a substantially transverse direction. Each gate line 121 protrudes downward and upward to form a gate electrode 124. The extended gate lines 121 may be connected to a driving circuit (not shown) integrated on the first substrate 110. Alternatively, one or more of the gate lines 121 may have an end portion (not shown) having a relatively large area for connection with another layer, or an external driving circuit which may be mounted on the first substrate 110 or mounted on other device such as a flexible printed circuit film (not shown).

Each storage electrode line 131 which also extends in the substantially transverse direction is connected to a plurality of sets of storage electrodes. Each set of the storage electrodes includes a first storage electrode 133a, a second storage electrode 133b, both extending in a substantially longitudinal direction, and a third storage electrode 133c extending in the substantially transverse direction. The third storage electrode 133c connects the first storage electrode 133a to the second storage electrode 133b at the substantial midpoint of the first and second storage electrodes 133a and 133b. Each of the first and second storage electrodes 133a and 133b has one end portion connected to the storage electrode line 131. A predetermined voltage such as a common voltage, which is applied to a common electrode 270 on the common electrode panel 200 of the LCD device, is applied to the storage electrode lines 131. The configuration of the storage electrode may have various modifications. For example, each storage electrode may include first and second storage electrodes that extend in the substantially longitudinal direction and third and fourth storage electrodes that extend in a substantially diagonal direction. In this modification, the first electrode is substantially parallel to the second electrode, and the third electrode is substantially perpendicular to the fourth storage electrode when extended. The first electrode is connected to the second electrode through the third and fourth electrodes.

In one embodiment, each of the gate lines 121 and the storage electrode lines 131 includes an aluminum (Al) containing metal such as Al or an Al alloy, a silver (Ag) containing metal such as Ag or an Ag alloy, a molybdenum (Mo) containing metal such as Mo and a Mo alloy, copper (Cu), chromium (Cr), titanium (Ti) or tantalum (Ta). Each of the gate lines 121 and the storage electrode lines 131 may have a multi-layered structure including two films with different physical characteristics. One layer includes a material such as Cr, Mo or a Mo alloy, Ti or Ta, which has good contact characteristics with other materials such as, but not limited to, indium tin oxide (ITO) or indium zinc oxide (IZO). The other layer includes a low resistivity metal, such as, but not limited to, an Al containing metal such as Al or an Al alloy or a Ag containing metal such as Ag or a Ag alloy in order to reduce signal delay or voltage drop in the gate lines 121 and the storage electrode lines 131. For example, a combination of an upper layer including Al and a lower layer including Cr, or a combination of an upper layer including Mo and a lower layer including Al may be suitable. In other embodiments, the gate lines 121 and the storage electrode lines 131 may include other various conductive materials.

In some embodiments, the lateral sides of the gate lines 121 and the storage electrode lines 131 may be inclined at an inclination angle in the range of about 30 to 80 degrees, relative to a surface of the first substrate 110.

A gate insulating layer 140 may be formed on the first substrate 110 having the gate lines 121 and the storage electrode lines 131. The insulating layer 140 includes silicon nitride (SiNx) in one embodiment.

A plurality of semiconductor strips 151 including hydrogenated amorphous silicon (hereinafter, abbreviated to 'a-Si') or polysilicon, in one embodiment, are then formed on the gate insulating layer 140. Each semiconductor strip 151 may extend in the substantially longitudinal direction and have a plurality of projections 154 branched out toward the gate electrode 124.

In one embodiment, a plurality of ohmic contact strips 161 and 165 are formed on the semiconductor strips 151. The ohmic contact strips 161 and 165 may include silicide or n+hydrogenated a-Si heavily doped with n type impurities. Each ohmic contact strip 161 has a projection 163. The projection 163 and the ohmic contact strip 165 are located on the projection 154 of the semiconductor strip 151.

Additionally, in one embodiment, the lateral sides of the semiconductor strips 151 and the ohmic contact strips 161 and 165 are inclined at angles in the range about 30 to 80 degrees relative to the surface of the first substrate 110.

A plurality of data lines 171, a plurality of drain electrodes 175, and a plurality of under-bridge metal pieces 172 are formed on the ohmic contact strips 161 and 165 and the gate insulating layer 140.

The data lines 171 are configured to transmit data signals and extend in the substantially longitudinal direction intersecting the gate lines 121 and the storage electrode lines 131. Each data line 171 is disposed between two adjacent first and second storage electrodes 133a and 133b. Each data line 171 has an end portion having a relatively large area for contact with other layers or external devices. The data lines 171 may include a plurality of branches that project toward the drain electrodes 175. These branches form source electrodes 173.

As illustratively shown, the rod shape end portion of the drain electrode 175 on the protrusion 154 of the semiconductor strip 151 is extended and then partially expanded for connection with other layers. The expanded portion is extended along the second storage electrode 133b, bent in a shape of '<', and then extended again along the second storage electrode 133b. The portions extended from the expanded portion are referred to as a 'coupling electrode'.

Each of the source electrodes 173 may be curved such that the curved portion partly encloses the end portion of the drain electrodes 175. The gate electrode 124, the source electrode 173, the drain electrode 175 and the projection 154 of the semiconductor strip 151 together form a TFT. A TFT channel is formed on the projection 154 between the source electrode 173 and the drain electrode 175.

The under-bridge metal pieces 172 overlap the gate lines 121 near the end portion of the first storage electrode 133a.

In one embodiment, the data lines 171, the drain electrodes 175 and the under-bridge metal pieces 172 include a refractory metal such as, but not limited to, Mo, Cr, Ta, Ti or Al or alloys thereof. Each of these elements may have a multilayered structure including one film comprising a refractory metal and another film comprising a low resistivity material. Examples of the multilayered structure include a combination of an upper layer comprising Al and a lower layer comprising Cr, or a combination of an upper layer comprising Mo and a lower layer comprising Al as mentioned above.

Like the gate lines 121 and the storage electrode lines 131, the data lines 171, the drain electrodes 175 and the under-bridge metal pieces 172 may have tapered lateral sides having an inclination angle in the range of about 30 to 80 degrees, relative to the surface of the first substrate 110.

The ohmic contact strips 161 and 165 are interposed between the semiconductor strips 151 and the data lines 171, between the semiconductor strips 151 and the source electrodes 173, and between the semiconductor strips 151 and the drain electrodes 175 to reduce the contact resistance therebetween.

A passivation layer 180 may be formed on the data lines 171, the drain electrodes 175, and the exposed portions of the semiconductor strips 151. In one embodiment, the passivation layer 180 includes a photosensitive organic material which renders flat characteristics. Illustratively, such material may include a low dielectric insulating material having a dielectric constant lower than about 4.0, such as, but not limited to, a-Si:C:O or a-Si:O:F. Such material may be formed by a plasma enhanced chemical vapor deposition (PECVD) process. Alternatively, the material may include an inorganic material such as silicon nitride or silicon oxide. The passivation layer 180 may include an inoragnic lower film and an organic upper film.

The passivation layer 180 has a plurality of contact holes 182 and 185 exposing the end portions of the data lines 171 and at least portions of the drain electrodes 175, respectively. The passivation layer 180 also has a plurality of contact holes 183 and 184 exposing the protruded end portions of the first storage electrode 133a and the storage electrode lines 131 near the end portions of the first storage electrode 133a opposite to the exposed protruded end portions, respectively. The contact holes 183 and 184 also expose the gate insulating layer 140.

In one embodiment, a plurality of pixel electrodes 190 each having a pair of first and second subpixel electrodes 190a and 190b, a plurality of contact assistants 82 and a plurality of storage overpasses 91 are formed on the passivation layer 180. The pixel electrodes 190, the contact assistants 82, and the storage overpasses 91 include a transparent conductive material such as ITO and IZO or an opaque conductive material having a high reflectivity such as Al in one embodiment.

The first subpixel electrode 190a is electrically connected to the drain electrode 175 through the contact hole 185 such that the data voltage is applied to the first subpixel electrode 190a. The second subpixel electrode 190b is capacitively coupled to the first subpixel electrode 190a, because the coupling electrode 176 which is electrically connected to the first subpixel electrode 190a overlaps the second subpixel electrode 190b.

When the data voltage is applied to the first subpixel electrode 190a, the first subpixel electrode 190a and the second subpixel electrode 190b which is capacitively coupled to the first subpixel electrode 190a generate electric fields in cooperation with a common electrode 270 to reorient LC molecules 310 in the LC layer 300.

Each subpixel electrode 190a and 190b forms a capacitor (hereinafter, referred to as a 'liquid crystal capacitor') with the common electrode 270 such that the applied voltage is stored after the TFT is turned off. For enhancing the voltage storage capacity, additional capacitors, which are connected to the liquid crystal capacitor in parallel, are provided. These capacitors are referred to as 'storage capacitors'. The storage capacitors are implemented by overlapping the pixel electrodes 190a and 190b with the storage electrode lines 131 including the storage electrodes 133a, 133b, and 133c.

Each subpixel electrode 190 may have a chamfered edge. The chamfered edge is inclined at an angle of about 45 degrees, in one embodiment, relative to the gate lines 121.

The first subpixel electrode 190a and second subpixel electrode 190b engage with each other and enclose an open space (hereinafter, referred to as a 'gap') such that their outer boundary has a substantially rectangular shape. In one embodiment, the second subpixel electrode 190b may be shaped like a rotated equilateral trapezoid. The second subpixel electrode 190b may have a left edge thereof disposed near the first storage electrode 133a, a right edge disposed near the second storage electrode 133b, and a pair of upper and lower oblique edges, each making an angle of about 45 degrees relative to the gate lines 121. The first subpixel electrode 190a may include a pair of right-angled trapezoid portions facing the oblique edges of the second subpixel electrode 190b and a longitudinal portion facing the left edge of the second subpixel electrode 190b. Accordingly, the gap 194 between the first subpixel electrode 190a and the second subpixel electrode 190b may include a pair of oblique lower and upper portions 191 and 193. Each oblique portion has a substantially uniform width and makes an angle of about 45 degrees relative to gate lines 121. The gap 194 may also include a longitudinal portion 195 having a substantially uniform width. As shown, the oblique portions 191 and 193 are longer than the longitudinal portion 195.

The second subpixel electrode 190b may have a cutout 192 extending along the storage electrode line 131 to substantially bisect the second subpixel electrode 190b into lower and upper partitions. The cutout 192 may have an inlet from the right edge of the second subpixel electrode 190b. Additionally, the inlet of the cutout 192 may have a pair of oblique edges each substantially parallel to the lower oblique portion 191 and the upper oblique portion 193 of the gap 194. Each of the gap 194 and the cutout 192 is substantially symmetrical about the third storage electrode 133c.

The number of partitions or the number of the cutouts may vary depending on design factors such as the size of pixels, the ratio of the transverse edges and the longitudinal edges of the first and second subpixel electrodes 190a and 190b, and the characteristics of the LC layer 300. Hereinafter, the gap 194 is referred to as a 'cutout' for descriptive convenience.

The storage overpasses 91 intersecting the gate lines 121 are connected to the exposed protruded end portions of the first storage electrodes 133a and the exposed portions of the storage electrode lines 131 through the contact holes 183 and 184, respectively. The storage overpasses 91 which overlap the under-bridge metal pieces 172 may be electrically connected to the under-bridge metal pieces 172. The storage electrode lines 131 having the storage electrodes 133a, 133b and 133c, the storage overpasses 91, and the under-bridge metal pieces 172 may be used for repairing defects in the gate lines 121, data lines 171, or the TFTs. The electrical connection between the gate lines 121 and the storage electrode lines 131 for the repair of the gate lines 121 may be performed by irradiating a laser beam onto the cross points of the gate lines 121 and the storage overpasses 91. In this case, the underbridge metal pieces 172 strengthen the electrical connection between the gate lines 121 and the storage overpasses 91.

The contact assistants 82 are connected to the end portions of the data lines 171 through the contact holes 182. The contact assistants 82 protect the end portions of the data lines 171 and enhance adhesion of the end portions of the data lines 171 with external devices. The contact assistants 82 are optional elements.

Hereinafter, the common electrode panel 200 will be described in detail with reference to FIGS. 2, 3, and 4. In FIG. 3, a light blocking member and a color filter are omitted.

A light blocking member 220 such as a black matrix that prevents light leakage is formed on a second substrate 210 including a transparent insulating material such as glass. The light blocking member 220 may include a plurality of openings facing the pixel electrodes 190. The shape of the openings may be substantially the same as that of the pixel electrodes 190. The light blocking member 220 may have a variety of shapes for blocking the light that leaks near the pixel electrodes 190a and 190b and the TFTs shown in FIG. 1.

A plurality of color filters 230 may be formed on the second substrate 210. The color filters 230 are mostly disposed in the areas enclosed by the light blocking member 220. The color filters 230 may extend in the longitudinal direction along the pixel electrodes 190. The color filters 230 may represent one of the primary colors such as red, green, and blue.

An overcoat 250 rendering a flat surface may be formed on the color filters 230 and the light blocking member 220 to cover the exposed color filters 230.

The common electrode 270, e.g., including a transparent conductive material such as ITO or IZO, may be formed on the overcoat 250. The common electrode 270 may include a plurality of sets of cutouts 271, 272, and 273.

The set of cutouts 271, 272, and 273 facing the pixel electrode 190 includes a lower cutout 271, a middle cutout 272, and an upper cutout 273. The cutouts 271, 272, and 273 are disposed between adjacent cutouts 192 and 194 of the pixel electrode 190 or between the cutouts 194 and the oblique edge of the pixel electrode 190 (see FIG. 1). In addition, each of the cutouts 271, 272, and 273 has at least one oblique portion extending parallel to the lower cutout 191 or the upper cutout 193 of the pixel electrode 190. Each of the cutouts 271, 272, and 273 is substantially symmetrical about the third storage electrode 133c.

As shown in FIG. 2, each of the lower and upper cutouts 271 and 273 may include an oblique portion, a transverse portion, and a longitudinal portion. The oblique portion extends from the left edge of the pixel electrode 190 to the lower or upper edge of the pixel electrode 190. The transverse portion and the longitudinal portion both extend from each end of the oblique portions along the edges of the pixel electrode 190 while overlapping the edges of the pixel electrode 190. The angle between the oblique portion and the transverse or longitudinal portions is obtuse.

In one embodiment, the middle cutout 272 may have a middle transverse portion, a pair of oblique portions and a pair of terminal longitudinal portions. The middle transverse portion extends approximately from the left edge of the pixel electrode 190 along the third storage electrode 133c. The pair of oblique portions extends from the end portion of the middle transverse portion approximately to the right edge of the pixel electrode 190. The angle between the middle transverse portion and the oblique portion is obtuse. The pair of terminal longitudinal portions extends from the end portion of the respective oblique portions along the right edge of the pixel electrode 190. The pair of longitudinal portions may overlap the right edge of the pixel electrode 190. The angle between the longitudinal portion and the oblique portion is obtuse. Although the middle cutout 272 mostly overlaps the second subpixel electrode 190b, some portion of the middle cutout 272 may overlap the cutout 194 or the first subpixel electrode 190a.

Referring to FIG. 2, at least a portion of the lower cutout 271 and at least a portion of the upper cutout 273 each have a first width W1, and at least a portion of the middle cutout 272 has a second width W2. The first width W1 is different from the second width W2. In one embodiment, the first width W1 is larger than the second width W2.

The first width W1 varies according to the voltage between the first subpixel electrode 190a and the common electrode 270, and the second width W2 varies according to the voltage between the second subpixel electrode 190b and the common electrode 270. For example, when the maximum voltage difference between the first subpixel electrode 190a and the common electrode 270 corresponds to about 5.6V to 7.0V, the first width W1 corresponds to about 10.5 μm to 11.5 μm. When the maximum voltage difference between the second subpixel electrode 190b and the common electrode 270 corresponds to about 3.3V to 5.6V, the second width W2 corresponds to about 6.5 μm to 10.5 μm, about 7.5 μm to 10.0 μm in one embodiment. The error range is approximately ±1.0 μm. The first width W1 is larger than the second width W2 by about 1.0 μm to 4.0 μm in one embodiment, e.g., by about 1.5 μm to 3.0 μm. In other words, the first width W1 is larger than the second width W2 by about 10% to 62%, about 15% to 40% in one embodiment.

The number of the cutouts 271, 272 and 273 may vary depending on design factors. In one embodiment, the light blocking member 220 may overlap the cutouts 271, 272 and 273 to block the light leakage near the cutouts 271, 272 and 273. The storage electrodes extended from the storage electrode lines 131 may have configurations overlapping the cutouts 271 and 273.

Polarizers 12 and 22 are provided on the outer surfaces of the panels 100 and 200, respectively. The axes of the polarizers 12 and 22 that transmit light are perpendicular with each other. One of the polarizers may not be employed in a reflective type LCD device.

In one embodiment, the LC layer 300 has negative dielectric anisotropy. The LC molecules 310 in the LC layer 300 are aligned such that their major axes are substantially vertical to the surfaces of the panels when no electric field is generated.

As mentioned above, a set of the cutouts 191, 192 and 193 and 271, 272 and 273 divides the pixel electrode 190 into a plurality of subareas. As shown in FIG. 3, each subarea has two major edges. The cutouts 192, 194 and 271, 272 and 273 control the tilt directions of the LC molecules 310 in the LC layer 300. In particular, the cutouts 194 and 271, 272 and 273 of the electrodes 190 and 270 distort the electric fields in the LC layer 300 to generate a horizontal component of the electric fields which is perpendicular to the edges of the cutouts 192, 194 and 271, 272 and 273. Accordingly, the tilt directions of the LC molecules 310 vary on every subarea, and therefore the reference viewing angle is widened. In one embodiment, the LC molecules 310 are tilted in approximately four directions.

At least one of the cutouts 191, 192 and 193 and 271, 272 and 273 can be substituted with protrusions or depressions, and the configuration of the cutouts 191, 192 and 193 and 271, 272 and 273 may be variously modified. The configuration of the coupling electrode 176 may also be modified.

Figure 5:
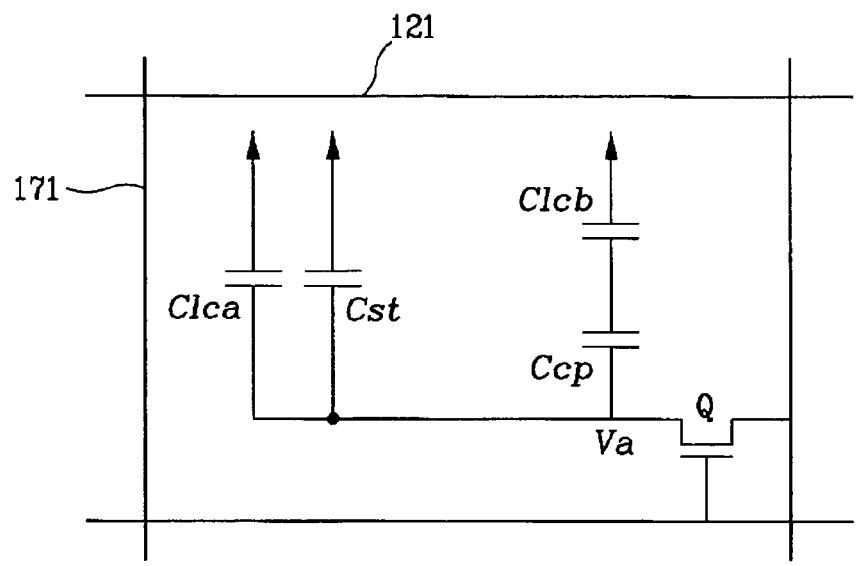
FIG. 5 is a schematic equivalent circuit diagram of the LCD device shown in FIG. 3.

The LCD device described above may be represented by a schematic equivalent circuit diagram depicted in FIG. 5.

Referring to FIG. 5, the TFT array panel includes a plurality of gate lines 121, a plurality of data lines 171 and a plurality of pixels. Each pixel has a pair of first and second LC capacitors Clca and Clcb, a TFT transistor Q and a coupling capacitor Ccp. The first LC capacitor Clca represents the capacitor between the common electrode 270 and the first subpixel electrode 190a, and the second LC capacitor Clcb represents the capacitor between the common electrode 270 and the second subpixel electrode 190b. The coupling capacitor Ccp represents the capacitor between the first subpixel electrode 190a and the second subpixel electrode 190b. The TFT transistor Q is connected to the gate line 121, the data line 171 and the first subpixel electrode 190a.

Hereinafter, the operation process of the pixel will be described in detail.

When a gate-on voltage is applied to the gate line 121, the TFT transistor Q connected to the gate line 121 is turned on to transmit a data voltage of the data line 171 to the first subpixel electrode 190a. The first subpixel electrode 190a is in turn charged by the data voltage, which then affects the voltage of the floated second subpixel electrode 190b capacitively connected to the first subpixel electrode 190a. The voltage of the first subpixel electrode 190a Va with respect to the common electrode 270 is represented as a function of the voltage of the second subpixel electrode 190b Vb as follows:

$$Vb = Va \times [Ccp/(Ccp+Clcb)]$$

wherein Ccp represents the capacitance of the coupling capacitor and Clcb represents the capacitance of the second LC capacitor, which simultaneously represent the capacitors.

Because Ccp/(Ccp+Clcb) is smaller than 1, the voltage of the second subpixel electrode 190b Vb is smaller than the voltage of the first subpixel electrode 190a Va.

The ratio of the voltage of the second subpixel electrode 190b Vb and the voltage of the first subpixel electrode 190a Va may be adjusted using the capacitance Ccp of the coupling capacitor (hereinafter, referred to as 'coupling capacitance'). The adjustment of the coupling capacitance Ccp may be carried out by changing the area of the coupling electrode 176 overlapping the second subpixel electrode 190b or the distance between the coupling electrode 176 and the second subpixel electrode 190b. The area of the coupling electrode 176 overlapping the second subpixel electrode 190b may be easily adjusted by changing the width of the coupling electrode 176, and the distance between the coupling electrode 176 and the second subpixel electrode 190b may be easily adjusted by changing the position of the coupling electrode 176. For example, unlike the configuration in FIGS. 1 to 4, a coupling electrode formed on the same layer with the gate line may increase the distance between the coupling electrode and the second subpixel electrode.

As described above, the voltage of the first subpixel electrode 190a becomes different from the voltage of the second subpixel electrode 190b, and thus the distortion of the gamma curve may be reduced.

The electric fields overlap in the cutouts 192, 194, 271 and 273. The vertical components of the electric fields in the cutouts 192, 194, 271 and 273 have the same direction, and the horizontal components of the electric fields in the cutouts 192, 194, 271 and 273 have opposite directions. Thus, the vertical component of composed electric field increases as the intensity of each electric field increases. The horizontal component of the composed electric field, however, decreases as the width of the cutouts 192, 194, 271 and 273 becomes narrow even though the intensity of each electric field is maintained.

The tilt directions of the LC molecules 310 at two adjacent edges of the cutouts 192, 194, 271 and 273 are opposite. Thus, the tilt directions of the LC molecules 310 start to change from the cutouts 192, 194, 271 and 273. When the vertical component of the composed electric field increases or when the horizontal component of the composed electric field decreases, the LC molecules 310 near the cutouts 192, 194, 271 and 273 are severely inclined due to splay elasticity. Therefore, failures such as a residual image or stain appear. Thus, it may be necessary to widen the width of the cutouts 192, 194, 271 and 273 irrespective of the voltage applied to the pixel electrode 190, which, however, may decrease the aperture ratio. Thus, it may be desirable to determine each width of the cutouts 192, 194, 271 and 273 according to each voltage applied to the pixel electrode 190.

In one embodiment, the widths of the cutouts 192, 194, 271 and 273 according to the intensity of the electric field, i.e., the voltage difference between the pixel electrode 190 and the common electrode 270 will be described in detail with reference to FIGS. 3 and 6.

Figure 6:
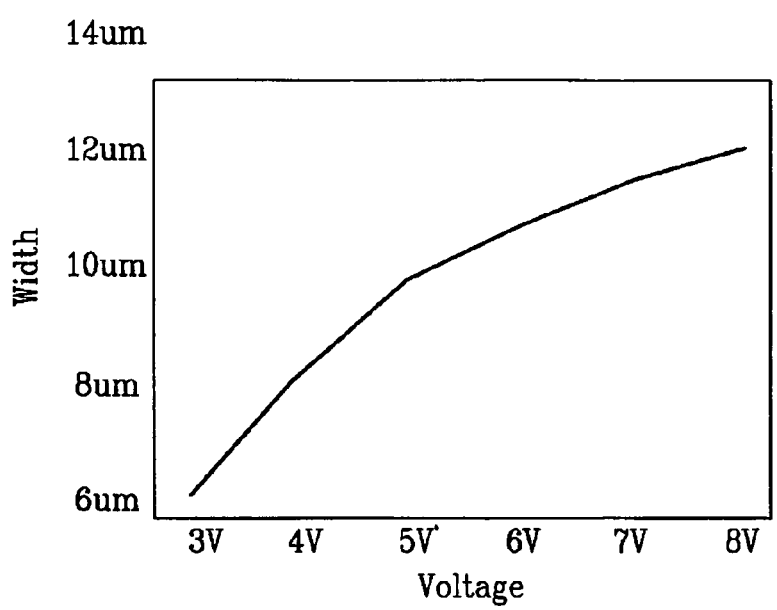
FIG. 6 is a graph illustrating a width of a cutout of a common electrode as a function of a voltage applied to an LC capacitor.

FIG. 6 is a graph illustrating an exemplary width of the cutout of the common electrode according to the voltage of the LC capacitor (hereinafter, referred to as a 'subpixel voltage'). The width of the cutout is defined to be a width that does not cause failures such as a residual image, stain or fingerprint while maintaining the brightness of the LCD device.

In one embodiment, for the LCD device shown in FIGS. 1 to 5, the maximum voltage applied to the first LC capacitor Clca is in the range of about 5.6 to 7.0V, and the maximum voltage applied to the second LC capacitor Clcb is in the range of about 3.3 V to 5.6V which corresponds to about 60% to 80% of the maximum voltage applied to the first LC capacitor Clca. As shown in FIG. 6, the first width W1 is in the range of about 10.5 µm to 11.5 µm, and the second width W2 is in the range of about 6.5 µm to 10.5 µm, from 7.5 µm to 10.0 µm in one embodiment. The error range is approximately ±1.0 µm. The first width W1 is larger than the second width W2 by about 1.0 µm to 4.0 µm in one embodiment, e.g., about 1.5 µm to 3.0 µm. That is, the first width W1 is larger than the second width W2 by about 10% to 62%, e.g., about 15% to 40%.

Varying the widths of the cutouts corresponding to the voltages of the subpixel electrodes enhances the aperture ratio of the LCD device, thereby increasing the brightness of the LCD device. In addition, failures such as a residual image, stain or fingerprint may be reduced to improve the picture quality of the LCD device.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A display device comprising:
   a first substrate;
   a first subpixel electrode formed on the first substrate;
   a second subpixel electrode formed on the same layer of the first substrate as the first subpixel electrode, the second subpixel electrode being spaced apart from the first subpixel electrode;

a coupling electrode contacting the first subpixel electrode, the coupling electrode overlapping and being capacitively coupled to the second subpixel electrode;

a second substrate overlying the first substrate;

a common electrode having a first cutout and a second cutout formed on the second substrate, the first cutout being disposed over the first subpixel electrode and the second cutout being disposed over the second subpixel electrode; and a liquid crystal layer interposed between the first substrate and the second substrate, wherein at least a portion of the first cutout has a first width and at least a portion of the second cutout has a second width different from the first width, and wherein the coupling electrode overlaps at leas t one of the first cutout and the second cutout.

2. The display device of claim 1, wherein a voltage applied to the first subpixel electrode is different from a voltage applied to the second subpixel electrode.

3. The display device of claim 1, wherein the first width is larger than the second width by about 10% to about 62%.

4. The display device of claim 1, wherein the first width is larger than the second width by about 15% to about 40%.

5. The display device of claim 1, wherein the first width is larger than the second width by about 1.0 μm to about 4.0 μm.

6. The display device of claim 1, wherein the first width is larger than the second width by about 1.5 μm to about 3.0 μm.

7. The display device of claim 1, wherein a voltage applied to the second subpixel electrode corresponds to about 60% to 80% of a voltage applied to the first subpixel electrode.

* * * * *